United States Patent
Gonzalez del Solar et al.

(10) Patent No.: US 10,095,499 B2
(45) Date of Patent: Oct. 9, 2018

(54) OPTIMIZATION FOR MULTI-PROJECT PACKAGE MANAGER

(71) Applicant: Microsoft Technology Licensing, LLC, Redmond, WA (US)

(72) Inventors: Peter B Gonzalez del Solar, Mercer Island, WA (US); Nicholas A Pape, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/587,323

(22) Filed: May 4, 2017

(65) Prior Publication Data

US 2018/0081661 A1 Mar. 22, 2018

Related U.S. Application Data

(60) Provisional application No. 62/396,087, filed on Sep. 16, 2016.

(51) Int. Cl.
| | |
|---|---|
| *G06F 9/445* | (2018.01) |
| *G06F 8/61* | (2018.01) |
| *G06F 17/30* | (2006.01) |
| *H04L 29/08* | (2006.01) |

(52) U.S. Cl.
CPC .......... *G06F 8/61* (2013.01); *G06F 17/30864* (2013.01); *H04L 67/34* (2013.01)

(58) Field of Classification Search
CPC ....... G06F 8/61; G06F 17/30864; H04L 67/34
USPC .................. 717/120–121, 174–178
See application file for complete search history.

(56) References Cited

U.S. PATENT DOCUMENTS

| | | | |
|---|---|---|---|
| 6,944,620 B2* | 9/2005 | Cleraux | G06F 17/30067 707/822 |
| 8,352,913 B2 | 1/2013 | Sakhare et al. | |
| 2003/0033187 A1* | 2/2003 | Jones | G06Q 10/06 705/7.23 |

(Continued)

FOREIGN PATENT DOCUMENTS

WO 2002015007 A1 2/2002

OTHER PUBLICATIONS

Abate et al., "MPM :A Modular Package Manager", 2011, ACM, pp. 179-187.*

(Continued)

*Primary Examiner* — Ted T Vo
(74) *Attorney, Agent, or Firm* — Schwegman Lundberg & Woessner, P.A.

(57) ABSTRACT

In one example, a project build tool may allow a developer device implementing a package manager to manage a superset of packages of software code across a wide variety of projects. A package manager may automatically install a superset of packages of reusable program code that are dependencies of a set of projects. A project build tool may provide to the package manager a configuration describing the superset of packages. A project build tool may install in a common folder the superset of packages in conformance with the package manager having a package resolution model that implements a hierarchical structure optimized for parental search. The developer device may store in a project folder for a project a set of symbolic links to a subset of dependency packages for the project contained in the common folder.

20 Claims, 10 Drawing Sheets

(56) References Cited

U.S. PATENT DOCUMENTS

| | | | |
|---|---|---|---|
| 2005/0262471 A1 | 11/2005 | Wagner et al. | |
| 2009/0307684 A1* | 12/2009 | Best | G06F 8/60 717/174 |
| 2015/0363195 A1* | 12/2015 | Schlueter | G06F 8/71 717/121 |
| 2017/0097821 A1* | 4/2017 | Gu | G06F 8/70 |

OTHER PUBLICATIONS

Narayan Desai, "Packages", 2013, Bcfg2 1.2.4 documentation, retrieved from http://docs.bcfg2.org/1.2/server/plugins/generators/packages.html , 14 pages.*

Frank Chen, "Node.js and NPM introduction for Visual Studio 2015", Dec. 2016, retrieved from https://medium.com/@frankchen2016/node-js-and-npm-introduction-for-visual-studio-2015-50ed9db8da22 , 7 pages.*

"What is the proper way to work with shared modules in Python development?", Available at:<<http://stackoverflow.com/questions/17174992/what-is-the-proper-way-to-work-with-shared-modules-in-python-development>>, Nov. 20, 2015, 3 pages.

"IntelliJ IDEA 2016.2 Help", Available at: <<https://www.jetbrains.com/help/idea/2016.2/opening-multiple-projects.html#d1630380e18>>, Sep. 5, 2016, 3 pages.

"Multiple applications in a single Visual Studio solution [closed]", Available at: <<http://programmers.stackexchange.com/questions/212760/multiple-applications-in-a-single-visual-studio-solution>>, Mar. 6, 2014, 3 pages.

"Development Tools", Available at: <<http://playground.arduino.cc/Main/DevelopmentTools>>, Jan. 23, 2015, 12 pages.

"Importing multiple projects into eclipse", Available at: <<http://stackoverflow.com/questions/6313858/importing-multiple-projects-into-eclipse>>, Jun. 14, 2013, 1 page.

Webb, Jamie, "Artifact resolution is unreasonably slow for multi-module projects", Available at: <<https://github.com/sbt/sbt/issues/413>>, Published on: Mar. 28, 2012, 11 pages.

Paulson, Josh, "Using Projects", Available at: <<https://support.rstudio.com/hc/en-us/articles/200526207-Using-Projects>>, Feb. 18, 2016, 4 pages.

Vladykin, Alexey, "Netbeans", Available at: <<https://netbeans.org/kb/docs/cnd/depchecking.html>>, Mar. 2014, 3 pages.

Neck, Andi, "Local Modules", Available at: <<https://www.npmjs.com/package/local_modules>>, Retrieved on: Sep. 14, 2016, 4 pages.

"Creating, Importing, and Configuring Java Projects", Available at: <<https://netbeans.org/kb/73/java/project-setup.html?print=yes>>, Retrieved on: Sep. 14, 2016, 13 pages.

* cited by examiner

300

OPTIMIZATION FOR MULTI-PROJECT PACKAGE MANAGER

PRIORITY INFORMATION

This application claims priority from U.S. Provisional Patent Application Ser. No. 62/396,087, filed Sep. 16, 2016, the contents of which are incorporated herein by reference in its entirety.

BACKGROUND

In JavaScript®, a package is a reusable library of program code that may be incorporated into a developer's project. A developer's project may also be a package itself. For purposes of clarity, the term "project" distinguishes code that the developer is working on versus code obtained from an external party. For example, a developer may code a JavaScript® project named "scheduler-site" to develop a web site application allowing people to schedule team events. Rather than writing new code for parsing dates, the developer may reuse a package called "date-formats." Rather than writing new code for displaying a table of results, the developer may reuse a package called "flexible-report." Since these libraries are created by other developers and published as open source, reusing this code may save time and effort.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to a project build tool that allows a developer device implementing a package manager to manage a superset of packages of software code across a wide variety of projects. A package manager may automatically install a superset of packages of reusable program code that are dependencies of a set of projects. A project build tool may provide to the package manager a configuration file describing the superset of packages. A project build tool may install in a common folder the superset of packages in conformance with the package manager having a package resolution model that implements a hierarchical structure optimized for parental search. The developer device may store in a project folder for a project a set of symbolic links to a subset of dependency packages for the project contained in the common folder.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a developer device, a computing device, or a machine-implemented method.

A project may add a library by declaring a dependency on the package for the library, describing a package name and compatible version pattern. In general, a package may depend on other packages, which in turn may depend on further packages. Thus, a package may have hundreds or thousands of dependencies when all the packages that are indirect dependencies are included. The developer may have difficulty manually copying each of these library packages onto his or her computer. Instead, a tool called a "package manager" may automatically install the packages onto the developers' computer.

In one example a project build tool may allow a developer device invoking a package manager to manage a superset of packages of software code across a wide variety of projects. A package manager may automatically install a superset of packages of reusable program code that are dependencies of a set of projects. A project build tool may provide to the package manager a configuration describing the superset of packages. A project build tool may install in a common folder the superset of packages in conformance with the package manager having a package resolution model that implements a hierarchical structure optimized for parental search. The developer device may store in a project folder for a project a set of symbolic links to a subset of dependency packages for the project contained in the common folder.

A developer device may use a project build tool with a package manager, such as Node Package Manager® for JavaScript®. The package manager may be optimized for the development of single projects, resulting in inefficiencies that arise when used across multiple projects. The project build tool may facilitate a developer working across multiple projects while still being compatible with the package manager.

Figure 1:
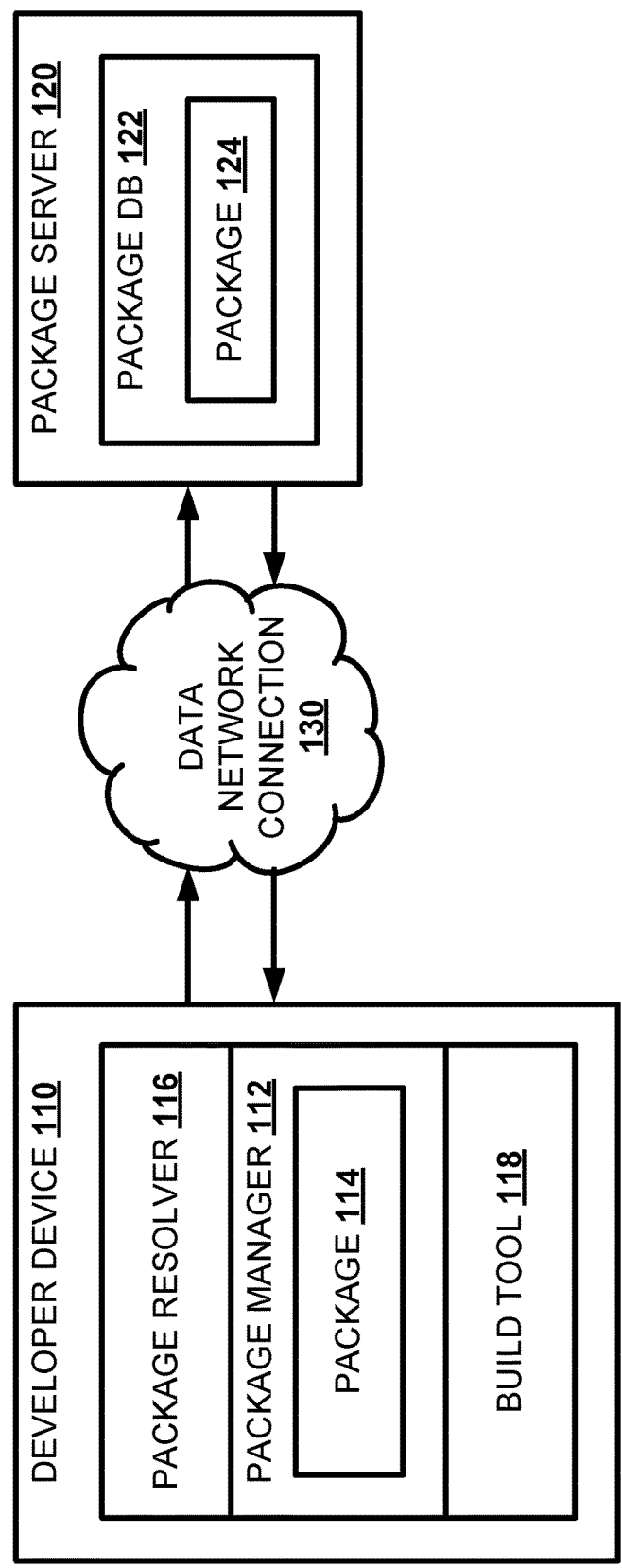
FIG. 1 illustrates, in a block diagram, one example of a network for software development.

FIG. 1 illustrates, in a block diagram, one example of a network 100 for software development. A developer may use a developer device 110 that executes a package manager 112 to query a package server 120 maintaining a network package database 122 via a data network connection 130.

The developer device 110 may be a desktop computer, a laptop computer, a tablet, a smart phone or computing device for coding. The data network connection 130 may be an internet connection, a wide area network connection, a local area network connection, or other type of data network connections. The package database 122 may be implemented on a single package server 120 or a distributed set of package servers 120, such as a server farm.

The package manager 112 may have a package 114 of reusable program code, such as a set of JavaScript code that calls a dependency package. Each package 114 may have a configuration file that lists the dependencies of the package 114. For each dependency, the configuration file may specify a package name, such as "flexible-report", and version pattern, such as "3.2.x", that the package manager 112 may attempt to satisfy. The package manager 112 may query a network package database 122 to locate a released version of a package 124 that satisfies the dependency, such as a package with a version number 3.2.1 to satisfy the version pattern "3.2.x". The package database 122 may provide other metadata, such as a download uniform resource locator.

For each dependency, the package manager 112 may download the appropriate version and extract the files into a folder on the developer device. A package resolver 116 may locate a package after installation by following a package resolution model. A package resolution model may prescribe the rules for locating a package. Different programming languages may use different package resolution models. The package resolver 116 may follow the Semantic Versioning industry standard in denoting the version pattern number. The package resolver 116 may use an "x" to indicate a range of acceptable versions, such as using "3.2.x" to denote 3.2.0, 3.2.1, 3.2.3, and so on. The package resolver 116 may also use more advanced notations understood by package managers 112, such as "~1.2.3" or ">1.2.3<=2.0.0".

If the downloaded package 124 has its own dependencies, then the package manager 112 may repeat the process recursively until each package dependency has been satisfied, such as by installing packages on the developer device. The package manager 112 may use a project build tool 118 to handle a large number of projects with multiple packages 114. The project build tool 118 may organize each package in a common folder.

Figure 2:
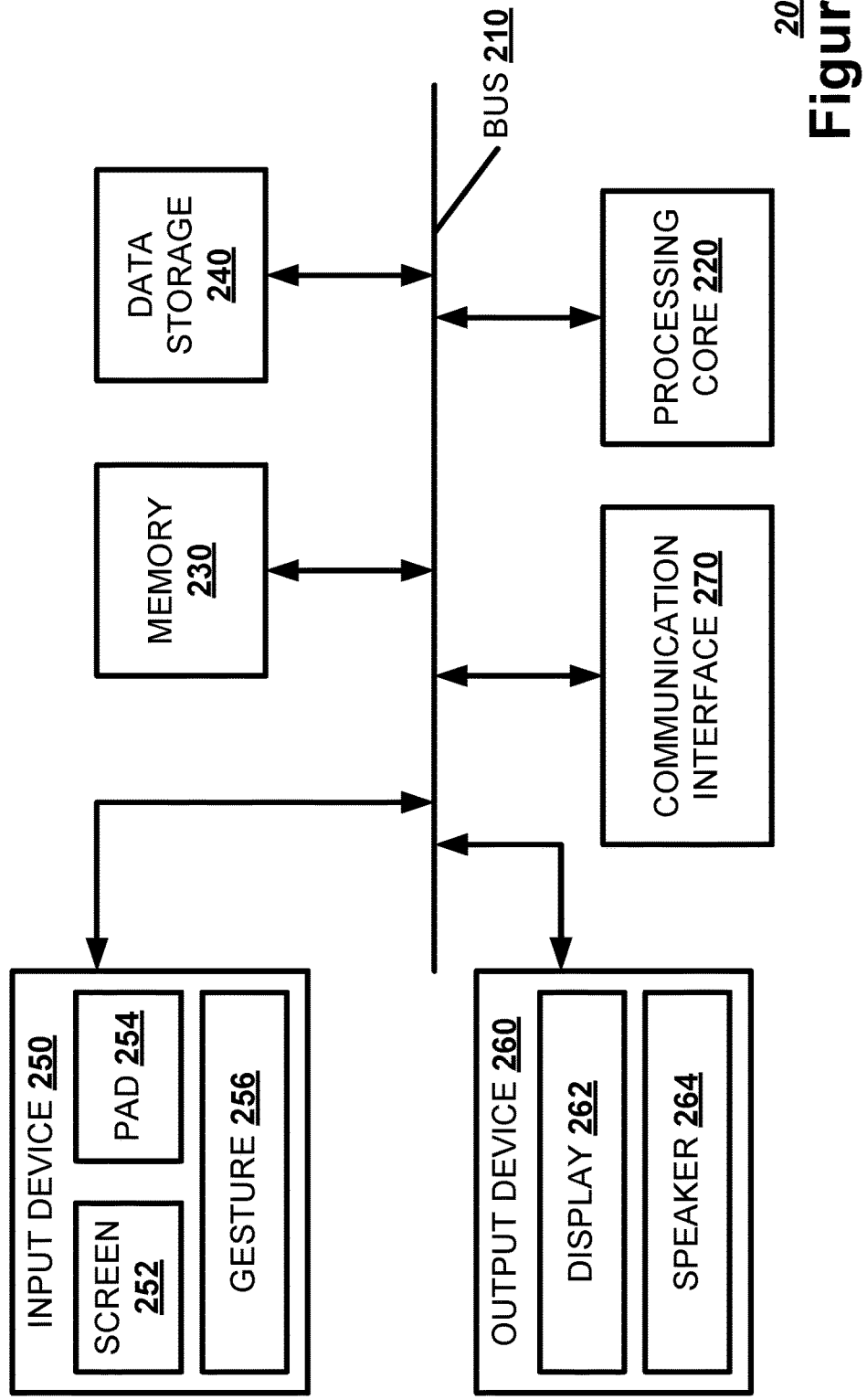
FIG. 2 illustrates, in a block diagram, one example of a computing device.

FIG. 2 illustrates a block diagram of an exemplary computing device 200 which may act as a developer device. The computing device 200 may combine one or more of hardware, software, firmware, and system-on-a-chip technology to implement a developer device. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to execute a package manager to automatically install a superset of packages of reusable program code that are dependencies of a set of projects. The processing core 220 may be further configured to execute a project build tool in conjunction with the package manager to manage packages across multiple projects.

The package manager may remove at least one of an extraneous dependency package or duplicate dependency package from the common folder. The package manager may further remove a dependency package from a previous installation from a developer device. The package manager may clean a disk cache of the package manager, removing data no longer being used. The package manager may execute a breadth-first search to find a dependency package having the shortest file path in the common folder. The package manager may provide to the project build tool a consistent dependency package for a symbolic link.

The project build tool may provide to a package manager a configuration describing the superset of packages. The project build tool may create a temporary package in the common folder to represent the project in the common package. The project build tool may also convert a development dependency package designation indicating subject to work by the developer, such as the devDependencies feature in Node Package Manager®, to a regular dependency package designation used by the developer in the dependency set for storing in a temporary package representing a project of the project set. The project build tool may install in a common folder the superset of packages in conformance with a package manager having a package resolution model that implements a hierarchical structure optimized for parental search. The project build tool may check a timestamp indicating a time of installation for a dependency package to determine whether to invoke the package manager. The project build tool may identify a version number for a dependency package. The project build tool may automatically generate a local link for a locally developed project.

The project build tool may direct the package manager to remove at least one of an extraneous dependency package or duplicate dependency package from the common folder. The project build tool may further direct the package manager to remove a dependency package from a previous installation from a developer device. The project build tool may additionally direct the package manager to clean a disk cache of the package manager. The project build tool may also receive from the package manager a dependency package having the shortest file path using a breadth-first search. The project build tool may further receive from the package manager a consistent dependency package for a symbolic link.

The memory 230 may be a random access memory (RAM) or another type of dynamic data storage that stores information and instructions for execution by the processing core 220. The memory 230 may also store temporary variables or other intermediate information used during execution of instructions by the processing core 220. The memory 230 may store a series of instructions that are executed by at least one processor of the processing core 220 to implement a project build tool.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing packages.

The data storage 240 may be configured to store in a project folder for a project a set of symbolic links to a subset of dependency packages for the project contained in the common folder. The data storage 240 may further be configured to distinguish a development dependency package installed to be subject to work by the developer from a regular dependency package used by the developer in the dependency set. The data storage 240 may also be configured to associate a dependency package with a timestamp indicating a time of installation. The data storage 240 may additionally be configured to represent a childless dependency package with a single symbolic link.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The output device 260 may include one or more conventional mechanisms that output information to the user, including a display screen 262, a printer, one or more speakers 264, a headset, a vibrator, or a medium, such as a memory, or a magnetic or optical disk and a corresponding disk drive.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to query a network package database for the superset of packages via the package manager.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3A:
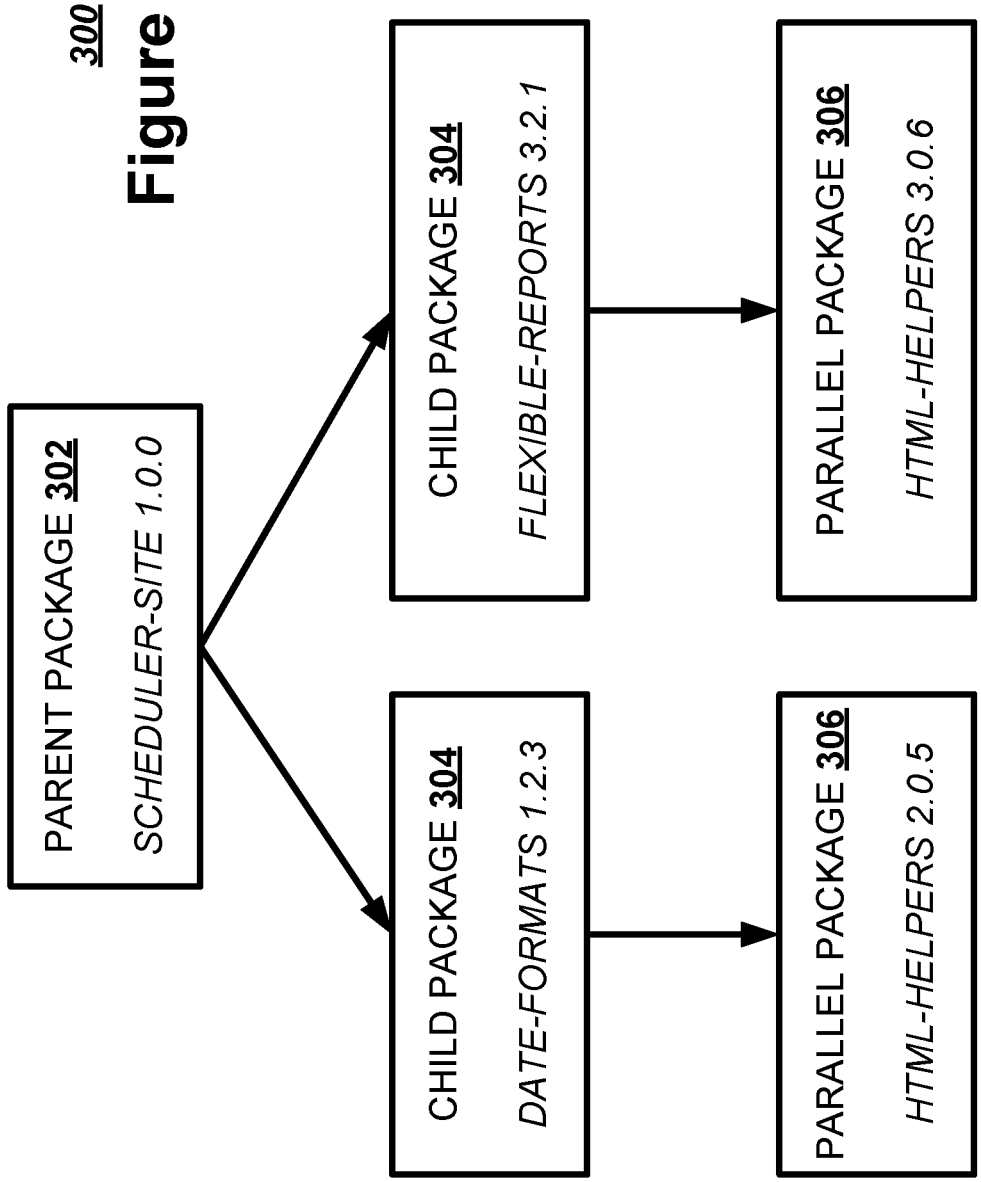
FIG. 3A illustrates, in a block diagram, one example of a side-by-side installation.

A developer device may use the described tools to manage one or more sets of one or more packages for a project. Previously, the developer device would use the package manager to develop a relatively simple package structure for a single project. In one example, a package, such as a developer's project, may reference multiple packages that each in turn rely on a different package, resulting in a "diamond dependency". FIG. 3A illustrates, in a block diagram, one example of a side-by-side installation 300. A parent package 302, for example, the developer's project "scheduler-site", may reference multiple child packages 304, for example, the packages "date-formats" and "flexible-reports". The configuration for each package may be as denoted:
  scheduler-site 1.0.0:
  date-formats: 1.2.x-->1.2.3
  flexible-report: 3.2.x-->3.2.1
  date-formats 1.2.3:
  html-helpers: 2.0.x-->2.0.5
  flexible-report 3.2.1:
  html-helpers: 3.0.x-->3.0.6

In this example, the developer of scheduler-site may declare a dependency on version pattern "1.2.x" of date-formats and version pattern "3.2.x" of flexible-reports. The package manager may find version number 1.2.3 of date-formats and 3.2.1 of flexible-reports, and install those versions of the packages to satisfy these dependencies. A "diamond" may arise when multiple child packages 304 both reference the same grandchild package. For example, both date-formats and flexible-reports may declare a dependency on the package html-helpers.

Moreover, each child package 304 may request incompatible version numbers, in that no single version number may satisfy both version patterns. In this example, the developer of date-formats may request version 2.0.x, whereas the developer of flexible-reports may request version 3.0.x. Thus, the package manager may install multiple copies of the package as parallel packages 306 in side-by-side versioning.

Figure 3B:
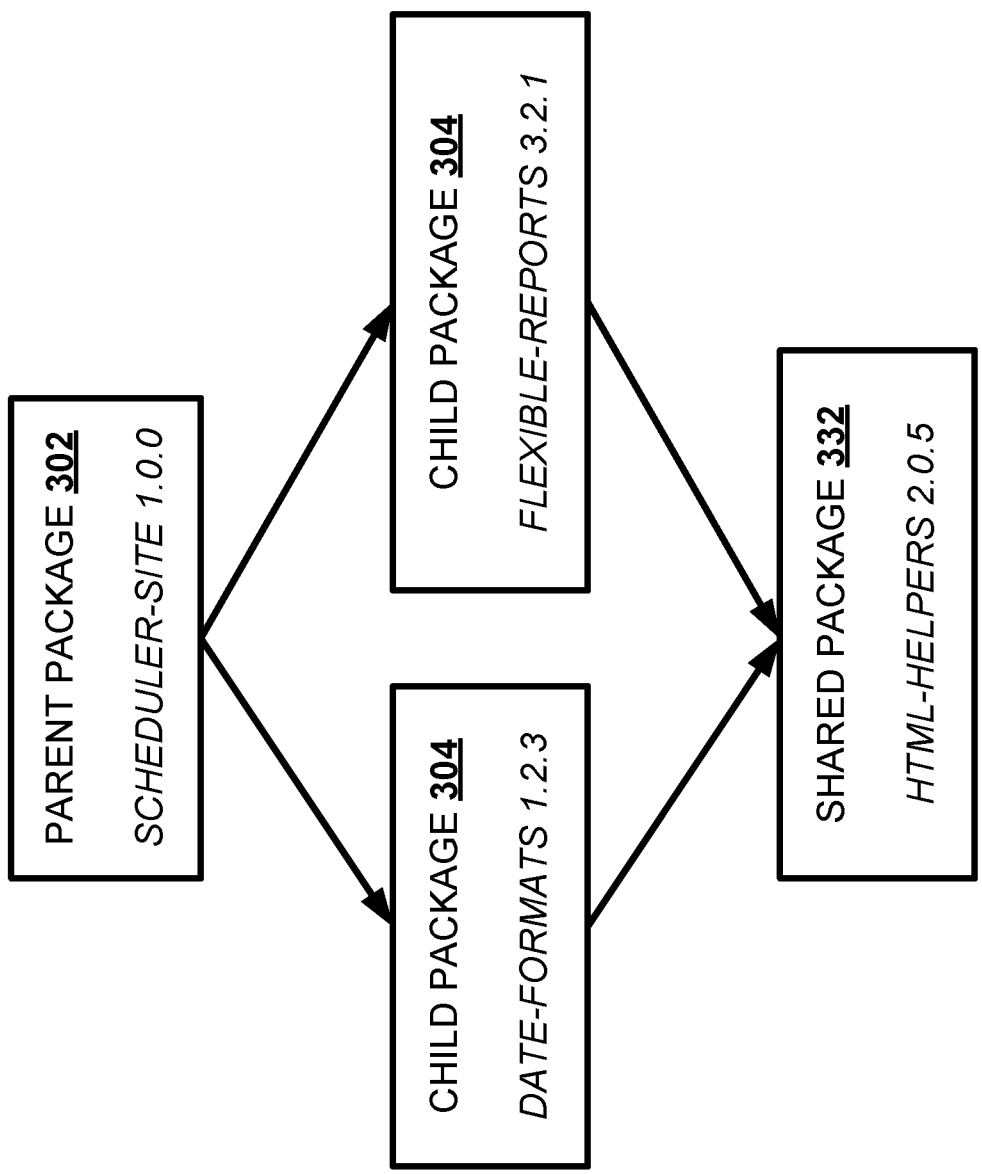
FIG. 3B illustrates, in a block diagram, one example of a shared installation.

Installing two copies of the program code has disadvantages, such as consuming expensive resources, degrading performance, and creating other engineering complexities. Wherever possible, a package manager may strive to install a shared dependency. FIG. 3B illustrates, in a block diagram, one example of a shared installation of a single version. In shared dependency, the package manager may install a single version of a shared package 332 that satisfies as many requested version patterns as possible. Ideally the package developers may coordinate to keep the child packages 304 referencing a grandchild package with the same version pattern, but often this is impractical. Side-by-side versioning may provide a solution for when the package developers never meet each other or cannot coordinate. In the above example, if flexible-reports 3.2.1 instead required html-helpers 2.x.x, the package manager may install html-helpers 2.0.5 to satisfy both dependencies.

Figure 3C:
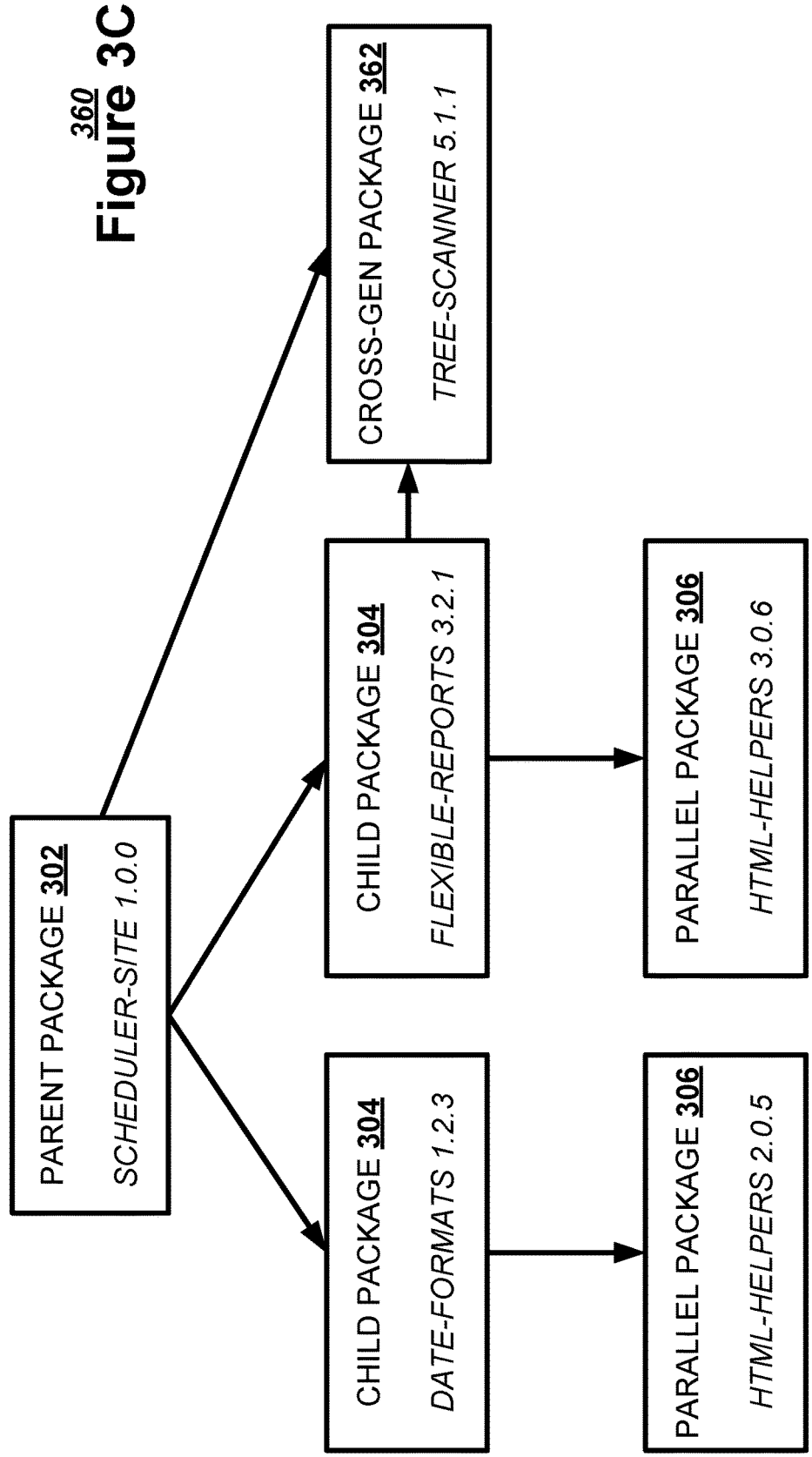
FIG. 3C illustrates, in a block diagram, one example of a hybrid installation.

FIG. 3C illustrates, in a block diagram, one example of a hybrid installation. Where possible, the package manager may seek a package having a version number that satisfies each requesting package. A parent package 302 and a child package 304 may both reference a cross-generational package 362. The previous example may be expanded by adding a "tree-scanner" dependency that does not require side-by-side versioning: by choosing version 5.1.1 of tree-scanner, the package manager can satisfy both scheduler-site (which requested version 5.x.x) and html-helpers (which requested version 5.1.1):
  scheduler-site 1.0.0 (the developer's project):
  date-formats: 1.2.x-->1.2.3
  flexible-report: 3.2.x-->3.2.1
  tree-scanner: 5.x.x-->5.1.1
  date-formats 1.2.3:
  html-helpers: 2.0.x-->2.0.5
  flexible-report 3.2.1:
  html-helpers: 3.0.x-->3.0.6
  html-helpers 2.0.5:
  (no dependencies)
  html-helpers 3.0.6:
  tree-scanner: 5.1.1-->5.1.1
  tree-scanner: 5.1.1:
  (no dependencies)

A package manager may be specialized for a specific programming language, such as Node Package Manager® for JavaScript®, RubyGems® for Ruby®, NuGet® for C#, or Pip® for Python®. The package manager may use a package resolution model having a hierarchical structure optimized for parental search, such as "node_modules model". In a parental search, if a file is not found in a folder, a package resolver may iteratively search the parent folder until the file is found or the root folder is reached. The package resolution model may support both deep trees and shallow trees. The package resolution model may have a layout depending on installation order. The package resolution model may support inverse declarations, called "peer dependencies".

The package resolution model may install the packages as a hierarchy of file folders. The package resolver may then retrieve those packages by successively examining parent folders and stopping at the first matching name, presuming a correct version number. In this model, the package manager may solve any versioning problems ahead of time during installation, so that the package resolver may avoid reading configuration files or matching version numbers during lookup. This approach to a package resolution model may cause scalability problems solvable by a project build tool.

In the example described above for FIG. 3C, the package manager may install a folder tree in a project folder for a JavaScript® application scheduler-site. The project folder for scheduler-site may store an executable script and associated files, as shown below:
C:\ scheduler-site:
package.json scheduler-site 1.0.0
README.md
scheduler.js The package resolution model for a package manager may define a configuration file to specify the dependencies for a given package, in this example, the package.json file. The package.json file for scheduler-site may list:

```
{
    "name": "scheduler-site",
    "version": "1.0.0",
    "dependencies": {
        "tree-scanner": "5.x.x",
        "date-formats": "1.2.x",
Microsoft Corporation
        "flexible-report": "3.2.x"
    }
}
```

The package manager may then store the dependency packages for the "scheduler-site" in a package subfolder, such as a "node_modules" subfolder for Node Package Manager®, as shown below:
C:\scheduler-site\node_modules\date-formats:
package.json date-formats 1.2.3
date.js
C:\scheduler-site\node_modules\date-formats\node_modules\html-helpers:
package.json html-helpers 2.0.5
html.js
browser2.js
C:\scheduler-site\node_modules\flexible-report:
package.json flexible-report 3.2.1
report.js
C:\scheduler-site\node_modules\html-helpers:
package.json html-helpers 3.0.6
html.js
browser3.js
C:\scheduler-site\node_modules\tree-scanner:
package.json tree-scanner5.1.1
scan.js After the package manager has installed the above folders onto the developer device, a package resolver may load the packages. The package resolver may load the package during runtime for the application or analysis by a tool, such as a compiler. Upon reading a load instruction for a package in an application file, a package resolver may determine the load location for the package. The package resolver may initiate the search in the folder containing the application file. The package resolver may search for the package in a package sub folder, such as the "node_modules" sub folder. If the package resolver fails to find the package in the package subfolder, the package resolver may successively look at each parent folder for a package sub folder with a matching package name.

Figure 4:
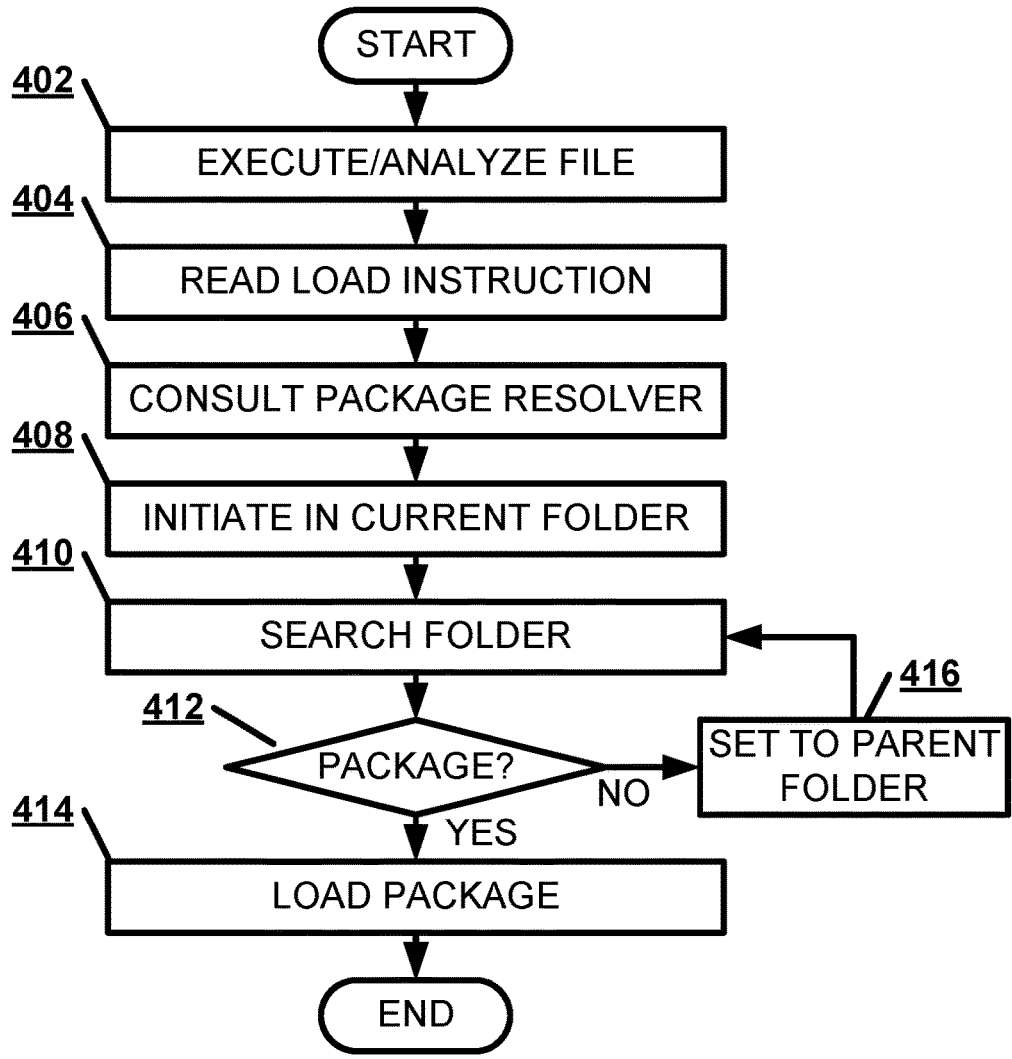
FIG. 4 illustrates, in a flowchart, one example of a method for a package resolver to load a package after installation.

FIG. 4 illustrates, in a flowchart, one example of a method 400 to find a package after installation. The developer device may execute or analyze an executable file in the project folder (Block 402). The developer device may read a load instruction for a dependency package from the configuration file (Block 404). The developer device may consult a package resolver upon encountering a load instruction (Block 406). The package resolver may initiate a search in the current folder containing the load instruction (Block 408). The package resolver may search the current folder for the dependent package described in the load instruction (Block 410). If the package resolver finds the dependency package in the current folder (Block 412), the package resolver may load the dependency package (Block 414). Otherwise, the package resolver may set the immediate parent folder as the folder to be searched (Block 416). The package resolver may search the new folder for the dependency package described in the load instruction (Block 410). The package resolver may repeat the search process with each successive parent folder until a match is found. If the package resolver searches a root-level folder without a match, the package resolver may report an error.

For example, a JavaScript® file browser2.js may contain program code reciting:
var scanner=require("tree-scanner").

During compilation or runtime, the package resolver may begin searching the folder containing the browser2.js file:
C:\scheduler-site\node_modules\date-formats\node_modules\html-helpers The package resolver may recursively search the following folders until finding the tree-scanner package:
[1] C:\scheduler-site\node_modules\date-formats\node_modules\html-helpers\node_modules\tree-scanner
[2] C:\scheduler-site\node_modules\date-formats\node_modules\tree-scanner
[3] C:\scheduler-site\node_modules\tree-scanner If folders [1] and [2] do not exist, the package manager may successfully stop searching at the tree-scanner package installation location in folder [3].

In an alternate example, the JavaScript® file date.js, located in the date-formats package, may contain program code reciting:
var scanner=require("html-helpers");

During compilation or runtime, the package resolver may begin searching the folder containing the date.js file:
C:\scheduler-site\node_modules\date-formats The package resolver may recursively search the following folders until finding the html-helpers dependency:

[1] C:\scheduler-site\node_modules\date-formats\node_modules\html-helpers

[2] C:\scheduler-site\node_modules\html-helpers

The package resolver may conclude the search at folder [1], as the html-helpers package, version 2.0.5, is present. Note that in this example, the package resolver may ignore folder [2], even though present and containing the html-helpers package, version 3.0.6. The package resolver may trust that the package manager arranged the folders so that the first folder searched contains the correct version of the html-helpers package for the date.js file.

In a further example, a JavaScript® file scheduler.js may contain program code reciting:

var scanner=require("tree-scanner");

During compilation or runtime, the package resolver may begin searching the folder containing the scheduler.js file:

C:\ scheduler-site:

The package resolver may just search the following folder:

[1] C:\scheduler-site\node_modules\tree-scanner

The package resolver may find the tree-scanner dependency in this sub folder. Failure to find the tree-scanner dependency in this sub folder may imply that the installation is incomplete or outdated, in which case the package resolver may report an error. The developer may invoke the package manager to redo the installation.

While the package manager may effectively organize packages for a single project, the package structure for multiple projects may quickly become unwieldly. Because packages may depend on packages, which may, in turn, depend on other packages, the package subfolder folder may quickly accumulate many indirect dependencies. A typical project may use 300 packages. Invoking a package manager install command to automatically install each of these packages onto the developer device may take 3 minutes. If each package contains an average of 20 files, the resulting package folder tree may contain 6,000 individual files. If this installation is performed at the beginning of the day or when the developer starts work on a new task, the developer may find a several minute wait manageable.

However, if the developer has 100 projects to be worked on as a group, under a conventional package resolution model, the developer may invoke an install command 100 times, each time creating a separate subtree of package subfolders. Thus, the 3-minute wait may balloon to become a 5 hour wait.

To avoid this issue, a developer may work on a single project at a time, as many in the industry currently do. For large scale production application development, a serial development may be impractical. For example, a change to one package may cause errors in a second package that may not be discovered until work commences on the second package.

Alternately, the package manager may consolidate the code for each project into a single monolithic project. This development approach may be difficult to maintain, as the consolidation may dissolve the package boundaries that isolate each component of the system. Further, the consolidation may make code sharing between projects difficult.

Additionally, the package manager may create an empty root project that "depends" on the real projects, as if each project was installed in the package subfolder. This root project may be awkward to use in practice. For example, the root project may invert the folder structure, so that the real projects become mingled with the installed external dependencies, causing confusion. Additionally, because this root project may provide packages that were not actually requested, oversights may occur. For example, a project may depends on a first package. If the developer uses the first package from within a second package, the package resolver may find the first package even if no dependencies were declared in the configuration file of the second package. Despite this oversight, the second package may appear to work correctly during development, but cause strange errors later when the second package is published.

Further, the package manager may use a naive symbolic link approach. A symbolic link, often referred to as a "symlink", is a standard feature of computer operating systems that provides a mechanism for the contents of one folder to appear in a different folder without actually copying any files. The package manager may install the dependencies once in a central "common" folder. The package manager may then create symbolic links from the package subfolder of each project. This approach may preserve the proper folder structure, but does not prevent oversights dues to package mingling. Also, the symbolic links may conflict with local links used to test a package before publishing. The local links may cause infinite loops that confuse developer tools. For example, if Folder3 is symbolic linked to Folder1, a directory scanner might encounter a loop such as C:\Folded1\Folder2\Folder3\Folder2\Folder3\Folder2 . . .

Figure 5:
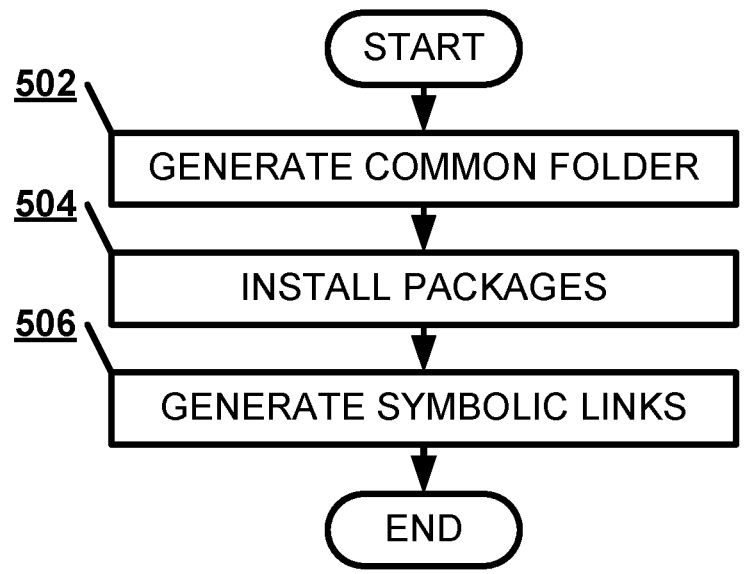
FIG. 5 illustrates, in a flowchart, one example of a method for a project build tool to arrange packages across multiple projects.

To avoid these issues, a developer device may use a project build tool in concert with the package manager to manage multiple projects without the package structure becoming too unwieldy. The project build tool may combine the empty root project with naive symbolic links to facilitate developer work across multiple projects. FIG. 5 illustrates, in a flowchart, one example of a method 500 to use the project build tool to arrange packages across multiple projects. The project build tool may present three commands for invocation by the developer as part of a workflow. The project build tool may execute a "generate" command. The project build tool may use the "generate" command to generate a single, central common folder for the package manager to install packages for each project (Block 502). The developer may limit use of the "generate" command to starting a new project or editing configuration files.

The project build tool may execute an "install" command. The project build tool may use the "install" command to install packages into the common folder, according to the plan constructed by the "generate" command. The project build tool may install in a common folder the superset of packages in conformance with a package manager having a package resolution model that implements a hierarchical structure optimized for parental search (Block 504). The developer may invoke the "install" command upon downloading the latest source code from a version control system.

The project build tool may execute a "link" command. In the "link" command, the project build tool may generate in a project folder for a project a set of symbolic links to a subset of dependency packages for the project contained in the common folder (Block 506). The "generate" and "install" commands may manipulate the common folder. After either of these operations, the project build tool may use the "link" command to set up the package subfolders for each project of a developer. The project build tool may create symbolic links between the packages in the common folder and the package sub folders in each project folder. The "link" command may construct package subfolders for multiple projects in just a few seconds.

Figure 6:
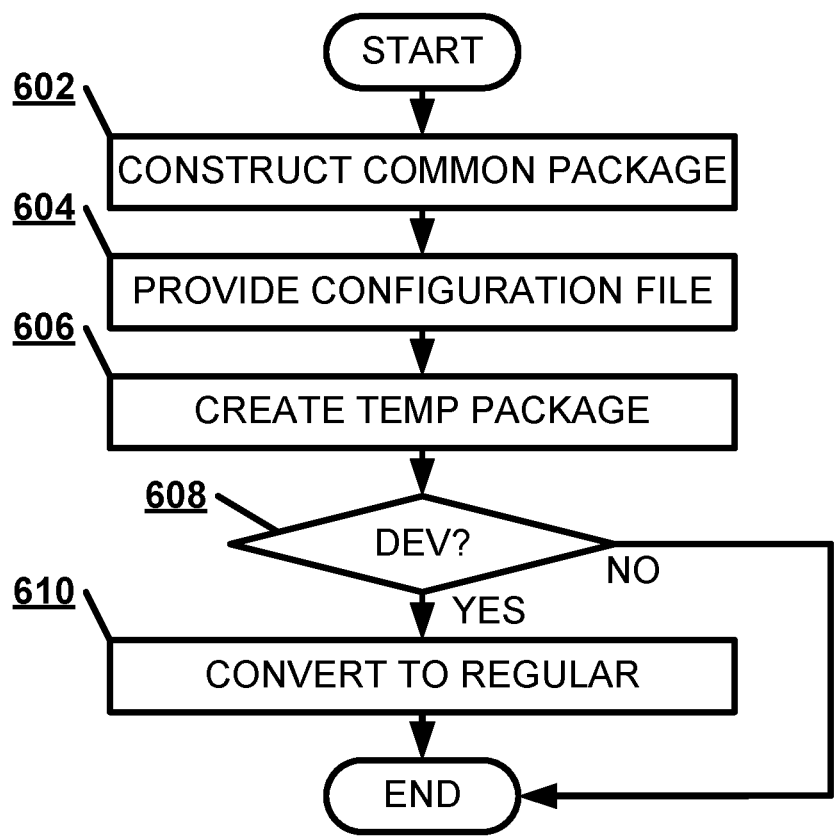
FIG. 6 illustrates, in a flowchart, one example of a method for a project build tool to execute a "generate" command.

FIG. 6 illustrates, in a flowchart, one example of a method 600 to execute a "generate" command with the project build tool. The project build tool may construct a single common package in a central common folder (Block 602). The project build tool may avoid using the common package directly. Rather, the common package may merely instruct the package manager to install a superset of the packages. The project build tool may provide to a package manager a configuration file describing a superset of packages of reusable program code that are dependencies of a set of projects (Block 604). For example, if the developer is working on 100 projects, each project will have a configuration file describing the dependency packages for each project, for a total of 100 configuration files. The package manager may add each dependency of each file as a dependency of the common package. A developer may install each package for each active project by invoking the package manager a single time on the common package, thus waiting 3 minutes instead of 5 hours. The installation may be faster, as most projects of a single developer may share the same dependencies, allowing a single installation instead repeatedly installing copies.

A package manager may have a package resolution model that allows two different load instructions to request two different versions of the same dependency. For example, an application may use version 2.0.5 of html-helpers for talking to old servers and version 3.0.6 for talking to new servers. However, some package resolution models do not support this feature. For example, the package resolution model node_modules for Node Package Manager® does not support this feature, as the package resolver for Node Package Manager® trusts that the first folder found has the correct version. This limitation may prevent the configuration file for the common package from simply listing each dependency, as, for example, one of the dependency packages may request html-helpers version 2.0.5 and a different package may request version 3.0.6.

To work around this limitation, the project build tool may construct a temporary package for each real project. The common package may have dependencies on the temporary packages. For example, a developer may work on two projects with the following configuration files for each:

```
C:\build-folder\project-a\package.json:
{
    "name": "project-a",
    "version": "1.0.0",
    "dependencies": {
        "html-helpers": "2.0.x",
        "date-formats": "1.2.x",
        "flexible-report": "3.2.x"
    },
    "devDependencies": {
        "build-system": "1.x.x"
    }
}
C:\build-folder\project-b\package.json:
{
    "name": "project-b",
    "version": "1.0.0",
    "dependencies": {
        "html-helpers": "3.0.x",
        "project-a": "1.0.x"
    },
    "devDependencies": {
        "build-system": "1.x.x",
        "deploy-tool": "1.2.x"
    }
}
```

The generated temporary package may be structured as follows:

```
C:\build-folder\common\temp_modules\temp-project-a\package.json:
{
    "name": "temp-project-a",
    "version": "0.0.0",
    "private": true,
    "dependencies": {
        "html-helpers": "2.0.x",
        "date-formats": "1.2.x",
        "flexible-report": "3.2.x",
        "build-system": "1.x.x"
    }
}
C:\build-folder\common\temp_modules\temp-project-b\package.json:
{
    "name": "temp-project-b",
    "version": "0.0.0",
    "private": true,
    "dependencies": {
        "html-helpers": "3.0.x",
        "build-system": "1.x.x",
        "deploy-tool": "1.2.x"
    }
}
```

The common package may reference the temporary packages as follows:

```
C:\build-folder\common\package.json:
{
    "name": "common-package",
    "version": "0.0.0",
    "private": true,
    "dependencies": {
        "temp-project-a": "file:./temp_modules/temp-project-a",
        "temp-project-b": "file:./temp_modules/temp-project-b"
    }
}
```

By depending on the temporary packages, the common package may express a dependency on both version 2.0.x and 3.0.x of html-helpers.

The common package may use a special "file:" notation to refer directly to the temp packages, rather than expecting to obtain temporary package from the regular package database. The dependencies of the temporary package may be similar to the underlying project, with two key differences. First, as a package manager may distinguish a development dependency package installed to be subject to work by the developer from a regular dependency package used by the developer in the dependency set and the projects may become indirect dependencies of the common package, the development dependency packages may not get installed unless converted into regular dependencies for the temporary package. Secondly, a first project may depend on a second project without appearing in the configuration file, as the second project may be a local link.

Thus, the project build tool may create a temporary package in the common folder to represent the project in the common package (Block 606). If a package is for a development dependency package (Block 608), the project build tool may convert a development dependency package designation to a regular dependency package (Block 610).

The "install" command may invoke the package manager to install the dependencies of the common package. The "install" command creates a single package subfolder containing a superset of each package for each project of the developer. The "install" command may forgo creation of a package sub folder for each project. The "link" command may create the package subfolder on a project basis.

The "install" command may provide many other features. For example, the "install" command may use file timestamps to detect whether the installation may be skipped due to no changes to the packages from the previous installation, avoiding invocation of the package manager. The "install" command may also optimize the arrangement of the packages by invoking the package manager to prune extraneous dependency packages or removing duplicate packages. The "install" command may further remove old files been left from previous installations. The "install" command may additionally clean the disk cache of the package manager.

Figure 7:
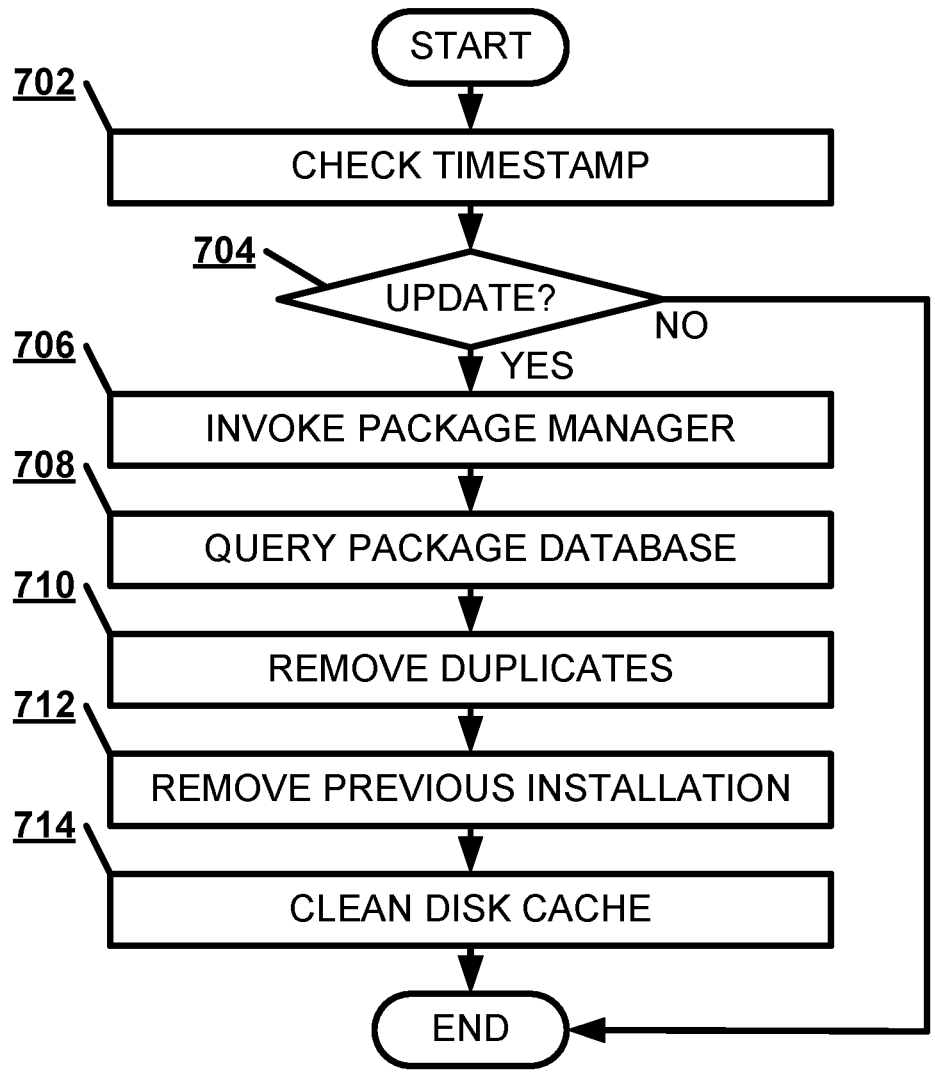
FIG. 7 illustrates, in a flowchart, one example of a method for a project build tool to execute an "install" command.

FIG. 7 illustrates, in a flowchart, one example of a method 700 to execute an "install" command with the project build tool. The project build tool may check a timestamp indicating a time of installation for a dependency package to determine whether to invoke the package manager (Block 702). If the timestamp of the dependency package indicates an updated package (Block 704), the project build tool may invoke the package manager to install the updated packages (Block 706). The package manager may query a network package database for the superset of packages with the package manager (Block 708). The package manager may remove at least one of an extraneous dependency package or duplicate dependency package from the common folder (Block 710). The package manager may remove a dependency package from a previous installation from a developer device (Block 712). The package manager may clean a disk cache of the package manager (Block 714).

The "link" command may presume that each package has been installed somewhere in the packages subfolder of the common folder. Upon invocation of the "link" command, the project build tree may forgo construction of an appropriate package subfolder tree for each project. However, the "link" command increase speed of operation by creating symbolic links in the common folder, rather than installing the packages. The "link" command may use a mixture of file folders and symbolic links to construct a minimal folder tree by relying on two utilities.

The project build tool may use a PackageInfo data structure to represent a tree of installed package folders. The PackageInfo data structure is a JavaScript® data structure. The project build tool may maintain a tree for the common folder and a tree for a symbolic linked package subfolder for the project. The PackageInfo class may track the package name, version number, list of dependencies, and folder path on disk describing the location of the package installation. Because the package manager may arrange the package sub folders hierarchically on disk, the PackageInfo objects may have parent/children pointers to form a tree data structure. The parent pointer is null for a PackageInfo object that serves as the root of the tree, such as the common package. The PackageInfo class may provide a ResolveOrCreate function to simulate a package resolver. The ResolveOrCreate function may search the subfolder hierarchy for the nearest matching package with the package name. Note that during the "link" command, the nearest match may have an incompatible version. If a match is found, then the "found" result may not be undefined. In either case, the ResolveOrCreate function may indicate where the missing dependency may be added if the requested dependency was not found or was found with an incompatible version. The ResolveOrCreate function may search each of the child packages in the subfolder for a matching package. If no matching package is found in the child package, the ResolveOrCreate function may iteratively search each parent subfolder in the subfolder tree. The project build tool may use the ResolveOrCreate member function to simulate the package resolver by finding dependencies in the common folder and inserting symbolic links into a package subfolder for the project.

In some situations, the package resolution model may unavoidably cause the package manager to install duplicate copies of the exact same package in different sub folders of the sub folder tree of the common folder. When the "link" command is used to create a symbolic link to a duplicated package, the project build tool may implement a PackageFolderNormalizer utility to ensure that the same folder is used each time, and that the folder is on the shortest path. For example, the following folders may both be correct places to find date-formats version 1.2.3, but the first one is a better choice:

C:\build-folder\common\package-folder\lib1\date-formats

C:\build-folder\common\package-folder\lib2\package-folder\lib3\package-folder\date-formats For each project that the developer is working on, the "link" command may create symbolic links on disk to satisfy the dependencies for the project. For each project, the "link" command may create a tree of symbolic links in a package subfolder for that project.

The "link" command may perform a breadth-first search (BFS) using a queue data structure. A breadth-first search searches the neighboring nodes in a data tree before moving to nodes on other levels. Each item in the queue may store a PackageInfo objects to represent a package folder under the common folder whose dependencies have not been traversed yet. Each item in the queue may also store PackageInfo objects to represent a symbolic linked folder under the package subfolder of the project, identifying symbolic links to be created.

A common queue item may be part of a tree representing packages in the common folder, whereas a project queue item is part of a tree representing symbolic linked packages in the project folder. The "link" command may not create actual symbolic links on disk immediately. The "link" command may defer the creation of symbolic links until the end of the operation. The "link" command initializes the queue with one item, with the common queue item representing the installed temporary package, and the project queue item representing the real project.

The breadth-first search loop may process each queue item. For each dependency from a common queue item representing dependencies, the breadth-first search loop may look up the corresponding PackageInfo object that the package manager installed to satisfy that dependency to determine the version number chosen to match the version pattern. This lookup is performed by calling the ResolveOrCreate function to mimics the package resolver. The "link" command does not choose versions, but instead may rely on the choices of the package manager. This reliance may greatly simplify the project build tool by avoiding considering many minor quirks of the package manager that may cause subtle bugs or inconsistencies.

Next, the "link" command may invoke the ResolveOrCreate function a second time on the project queue item object to determine whether the symbolic linked folders that the "link" command has constructed so far already satisfy this dependency. In a first possible result, the ResolveOrCreate function may not find a symbolic linked package with the requested package name. In the second possible result, the ResolveOrCreate function may find a symbolic linked package with the requested package name, but the wrong version pattern. In the third possible result, the ResolveOrCreate function may find a symbolic linked package and the version is an exact match. For the third possible result, the "link" command may forgo further action. For both the first possible result and the second possible result, the "link" command may add a new PackageInfo object to the tree to satisfy the dependency. The ResolveOrCreate function may return a value indicating a location in the tree for the "link" command to add the correct symbolic linked folder. The "link" command may append the PackageInfo object to the queue. The "link" command may process each dependency. The bread first search outer loop may continue until the queue is empty, signifying that each dependency has been satisfied.

The "link" command may create the symbolic links on disk corresponding to the PackageInfo tree for the project. The "link" command may normalize the links using the PackageFolderNormalizer utility. If the PackageInfo object has no children, then "link" command may represent the entire package folder with a single symbolic link. Whereas if the PackageInfo object has children, the children may in general be different from the sub folders in the common folder. For a PackageInfo object with children, the "link" command may create a regular folder with the package name, and then create a symbolic link for each top-level file or folder. The "link" command may forgo creating a symbolic link for a package subfolder.

A local link is a link to a locally developed project, as opposed to a symbolic link to installed packages. A developer workflow may incorporate a package manager. The developer may fix bugs or make improvements to a library package. The developer may commit those changes to the version control system. The developer may publish the improved package with a new package version number. The developer may upgrade the application project to use the new version. The developer may test the application for bugs. When working on a library package, a lot of time may be saved by forgoing the commit, publish, and upgrade phases, to allow the developer to test the application immediately. Instead of installing the library package, the project manager may create a symbolic link to the real project folder containing the locally developed project, referred to herein as a local link.

The project build tool may provide a custom implementation of local links that is incorporated immediately prior to the first call to the ResolveOrCreate function. The project build tool may create local links automatically for each eligible project. The build tool may create local links just if the version numbers are compatible, allowing local links to be created for indirect dependencies. The local links for the project build tool do not link via intermediary global folders, allowing a developer to work on two different copies of the same project tree.

Figure 8:
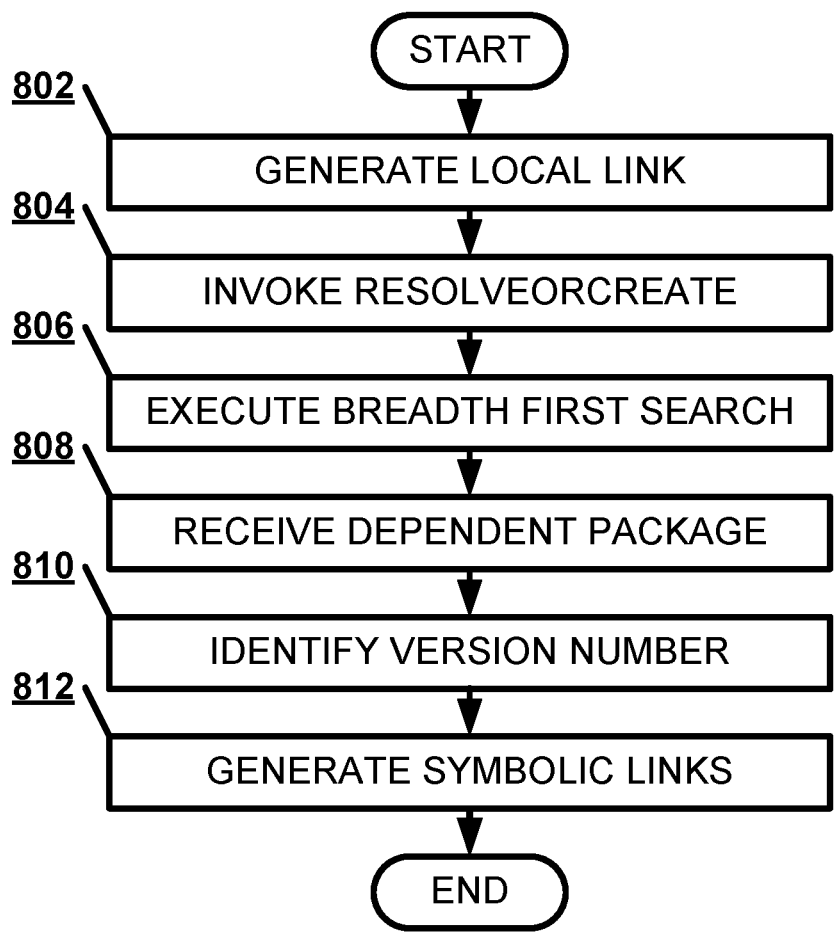
FIG. 8 illustrates, in a flowchart, one example of a method for a project build tool to execute a "link" command.

FIG. 8 illustrates, in a flowchart, one example of a method 800 to execute a "link" command with the project build tool. The project build tool may automatically generate a local link for a locally developed project (Block 802). The project build tool may invoke the ResolveOrCreate function (Block 804). The project build tool may execute a breadth-first search with caching to find a dependency package having the shortest file path (Block 806). The project build tool may receive a normalized dependency package for a symbolic link (Block 808). The project build tool may identify a version number for a dependency package (Block 810). The project build tool may generate in a project folder for a project a set of symbolic links to a subset of dependency packages for the project contained in the common folder (Block 812). The project build tool may represent a childless dependency package with a single symbolic link. Other packages may be represented using distinct symbolic links for each top-level file or folder, combined with an ordinary file folder, such as for the "node_modules" folder of Node Package Manager®.

Additionally, the project build tool may have an "unlink" command that deletes the symbolic links created by the "link" command. The project build tool may have a "rebuild" command that makes use of the PackageInfo data structure to perform an optimized parallel build of each project. The project build tool may derive a dependency graph from the local links described above. The project build tool may have a "check" command for scanning source files to detect dependencies that are missing from the configuration file.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A developer device, comprising:
  a processing core having at least one processor configured to execute:
    a package manager to automatically install a superset of packages of reusable program code that are dependencies of a set of projects, and
    a project build tool to:
      provide to the package manager a configuration describing the superset of packages, and
      install in a common folder the superset of packages in conformance with the package manager having a package resolution model that implements a hierarchical structure optimized for parental search; and
  a data storage configured to store, in a project folder for a project of the set of projects, a set of symbolic links to a subset of dependency packages for the project contained in the common folder.

2. The developer device of claim 1, further comprising:
  a communication interface configured to query a network package database for the superset of packages via the package manager.

3. The developer device of claim 1, wherein the project build tool is further configured to create a temporary package in the common folder to represent the project in the common package.

4. The developer device of claim 1, wherein the project build tool is further configured to convert a development dependency package designation indicating subject to work by the developer to a regular dependency package designation used by the developer in the dependency set for storing in a temporary package representing a project of the project set.

5. The developer device of claim 1, wherein the project build tool is further configured to check a timestamp indicating a time of installation for a dependency package to determine whether to invoke the package manager.

6. The developer device of claim 1, wherein the package manager is further configured to remove at least one of an extraneous dependency package and duplicate dependency package from the common folder.

7. The developer device of claim 1, wherein the package manager is further configured to remove a dependency package from a previous installation from a developer device.

8. The developer device of claim 1, wherein the package manager is further configured to clean a disk cache of the package manager.

9. The developer device of claim 1, wherein the package manager is further configured to execute a breadth-first search to find a dependency package having the shortest file path in the common folder.

10. The developer device of claim 1, wherein the project build tool is further configured to receive a consistent dependency package for a symbolic link.

11. The developer device of claim 1, wherein the project build tool is further configured to identify a version number for a dependency package.

12. The developer device of claim 1, wherein the data storage is further configured to represent a childless dependency package with a single symbolic link.

13. The developer device of claim 1, wherein the project build tool is further configured to automatically generate a local link for a locally developed project.

14. A computing device, having a memory to store a series of instructions that are executed by at least one processor to implement a project build tool, the computing device configured to
  provide to a package manager a configuration file describing a superset of packages of reusable program code that are dependencies of a set of projects;
  install in a common folder the superset of packages in conformance with a package manager having a package resolution model that implements a hierarchical structure optimized for parental search;
  create a temporary package in the common folder to represent a project in the common package; and
  generate in a project folder for the project a set of symbolic links to a subset of dependency packages for the project contained in the common folder.

15. The computing device of claim 14, wherein the computing device is further configured to
  query a network package database for the superset of packages with the package manager.

16. The computing device of claim 14, wherein the computing device is further configured to
  check a timestamp indicating a time of installation for a dependency package to determine whether to invoke the package manager.

17. The computing device of claim 14, wherein the computing device is further configured to
  execute a breadth-first search to find a dependency package having the shortest file path.

18. The computing device of claim 14, wherein the computing device is further configured to
  automatically generate a local link for a locally developed project.

19. A machine-implemented method, comprising:
  providing to a package manager a configuration file describing a superset of packages of reusable program code that are dependencies of a set of projects;
  installing in a common folder the superset of packages in conformance with a package manager having a package resolution model that implements a hierarchical structure optimized for parental search;
  create a temporary package in the common folder to represent a project in the common package;
  generating in a project folder for the project a set of symbolic links to a subset of dependency packages for the project contained in the common folder; and
  executing breadth-first search to find a dependency package having the shortest file path.

20. The method of claim 19, further comprising:
  automatically generate a local link for a locally developed project.

* * * * *